United States Patent
Nimura et al.

(10) Patent No.: US 6,537,711 B1
(45) Date of Patent: Mar. 25, 2003

(54) REVERSIBLE RECORDING MATERIAL BASED ON THERMAL ENERGY

(75) Inventors: Shigeaki Nimura, Chiba (JP); Hiroyuki Sugimoto, Kanagawa (JP); Nobuyuki Tamaoki, Ibaraki (JP); Hiroo Matsuda, c/o National Institute of Materials and Chemical Research, 1-1 Higashi, Tsukuba-shi, Ibaraki 305-0046 (JP); Yoshishige Kida, Osaka (JP)

(73) Assignees: Ricoh Company, Ltd., Tokyo (JP); Koji Kajimura, Tokyo (JP); Nobuyuki Tomaoki, Tsukuba (JP); Hiroo Matsuda, Tsukuba (JP); Okamura Oil Mill, LTD, Kashiwara (JP)

( * ) Notice: Subject to any disclaimer, the term of this patent is extended or adjusted under 35 U.S.C. 154(b) by 219 days.

(21) Appl. No.: 09/669,596

(22) Filed: Sep. 26, 2000

(30) Foreign Application Priority Data

Sep. 27, 1999 (JP) .............................. 11-273471
Mar. 1, 2000 (JP) ....................... 2000-056552

(51) Int. Cl.⁷ .......................... B41M 5/26; C09K 19/36
(52) U.S. Cl. ........................ 430/20; 430/19; 430/964; 252/299.7; 503/200
(58) Field of Search ............... 430/20, 19–964; 252/299.7; 503/200

(56) References Cited

U.S. PATENT DOCUMENTS 6,103,431 A * 8/2000 Tamaoki et al. ............... 430/20
6,183,666 B1 * 2/2001 Tamaoki et al. ......... 252/299.7
6,197,460 B1 * 3/2001 Tamaoki et al. ............... 430/20

FOREIGN PATENT DOCUMENTS

| JP | 6-258622 | | 9/1994 |
| JP | 8-152605 | | 6/1996 |
| JP | 11-24027 | | 1/1999 |
| JP | 2000-192044 | * | 7/2000 |
| JP | 2000-225772 | * | 8/2000 |

OTHER PUBLICATIONS

Computer tranlation for JP 2000–225772, http://www6.ipdl.jpo.go.jp/Tokujitu/PAJdetail.ipdl?N0000×60&N0120×01&N2001×2000–225772.*

Computer tranlation for JP 2000–192044 http://www6.ipdl.jpo.go.jp/Tokujitu/PAJdetail.ipdl?N0000×60&N0120×01&N2001×2&N3001×2000–192044.*

N. Tamaoki, et al., Advanced Materials, vol. 9, No. 14, pp. 1102–1104, "Rewritable Full–Color Recording on a Thin Solid Film of a Cholesteric Low–Molecular–Weight Compound", 1997.

* cited by examiner

Primary Examiner—Shean C. Wu
(74) Attorney, Agent, or Firm—Oblon, Spivak, McClelland, Maier & Neustadt, P.C.

(57) ABSTRACT

There is disclosed a reversible recording material having a liquid crystal mixture comprising at least two cholesteric liquid crystal compounds. The cholesteric liquid crystal compounds which are contained in the reversible recording material has a molecular weight of less than 2000 and a grass transition temperature equal to or more than 30° C. The two cholesteric liquid crystal compounds are compatible each other. After at least a part of the reversible recording material is heated to a temperature where the part of the reversible recording material becomes a cholesteric liquid crystal phase, the part of the reversible recording material is rapidly cooled down to below the glass transition temperature thereof, so that a reflecting color from the reversible recording material can be fixed to achieve a recording.

20 Claims, 2 Drawing Sheets

REVERSIBLE RECORDING MATERIAL BASED ON THERMAL ENERGY

BACKGROUND OF THE INVENTION

1. Field of the Invention

The present invention relates to a reversible recording material based on thermal energy, and more particularly to the reversible recording material comprising cholesteric liquid crystal compounds.

2. Description of the Related Art

For reversible recording media, many attempts have been made in recent years. Among these, Japanese Laid-Open Patent Application No. 11-24027 describes a reversible thermal recording material comprising a cholesteric liquid crystal compound having a molecular weight of less than 2000 and a glass transition temperature of more than 35° C., or a mixture thereof.

As shown in FIG. 1, the recording material comprising the cholesteric liquid crystal compound is placed between two substrates, one of the two substrates being provided with a light-absorbing layer on one side of the substrate, so as to form a reversible display device. The cholesteric liquid crystal compound in a cholesteric liquid crystal phase exhibits its typical iridescent colors. When the compound in the cholesteric liquid crystal phase is rapidly cooled by a suitable cooling means, the compound solidifies while keeping an iridescent color observed at a temperature where the rapid cooling started, thereby allowing a reflecting color from the cholesteric liquid crystal compound to be fixed. A desired reflecting color can be preserved by selecting the cooling commencement temperature of the cholesterlc liquid crystal phase. In this way, a variety of colors can be recorded stably at the room temperature.

Further, when the above solidified compound is heated to the cholesteric liquid crystal phase, that is to say, erasure is carried out, writing to the compound can be achieved again (See, N. Tamaoki et al., Adv. Mater., 1997, 9, 1102–1104). Thus, the above chloesteric liquid crystal compound can be applied for rewritable full-color recording and also for high density memory media.

Although the above compound has a promising feature for the reversible recording material, there is a problem relating to inability to provide the reflecting light having a long wavelength. To solve this problem, Japanese Laid-Open Patent Application Nos. 6-258622 and 8-152605 disclose a liquid crystal mixture comprising more than two cholesteric liquid crystal compounds dispersed in a polymer as the recording media. In this recording media, there may be occasions that a phase separation between the liquid crystal compound and the polymer occurs to fail to widen a wavelength range of the reflecting light.

SUMMARY OF THE INVENTION

Accordingly, it is an object of the present invention to provide a reversible recording material based on thermal energy in which the disadvantage of the aforementioned prior art is eliminated.

The inventors of the present invention have performed much research and investigation regarding a material for thermal reversible recording in which the faults described for the conventional technologies have been eliminated.

The above object of the present invention is achieved by a reversible recording material which is sensitive to heat, comprising a liquid crystal mixture comprising at least two cholesteric liquid crystal compounds, the at least two cholesteric liquid crystal compounds being compatible each other, wherein after at least a part of the reversible recording material is heated to a temperature where the at least a part of the reversible recording material becomes a cholesteric liquid crystal phase, the at least a part of the reversible recording material is rapidly cooled down to below a glass transition temperature thereof, so that a reflecting color from the reversible recording material can be fixed to achieve a recording.

The above object of the present invention is also achieved by a reversible recording material which is sensitive to heat, comprising a liquid crystal mixture comprising at least two cholesteric liquid crystal compounds, the at least two cholesteric liquid crystal compounds being compatible each other, wherein after at least a part of the reversible recording material is heated to a temperature where the at least a part of the reversible recording material becomes an isotropic phase, the at least a part of the reversible recording material is cooled down to below a glass transition temperature thereof at a predetermined cooling rate based on a reflecting color to be fixed, so that the reflecting color from the reversible recording material can be fixed to achieve a recording.

According to the present invention, at least one cholesteric liquid crystal compound forming the reversible recording material has a molecular weight of less than 2000 and a glass transition temperature equal to or more than 30° C.

The present invention provides a reversible recording material by which a reflecting color (light) having the wide wavelength range can be obtained without crystallization during a cooling process.

Furthermore, according to the present invention, it is possible to preserve the reflecting color at the room temperature for a long period.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 2:
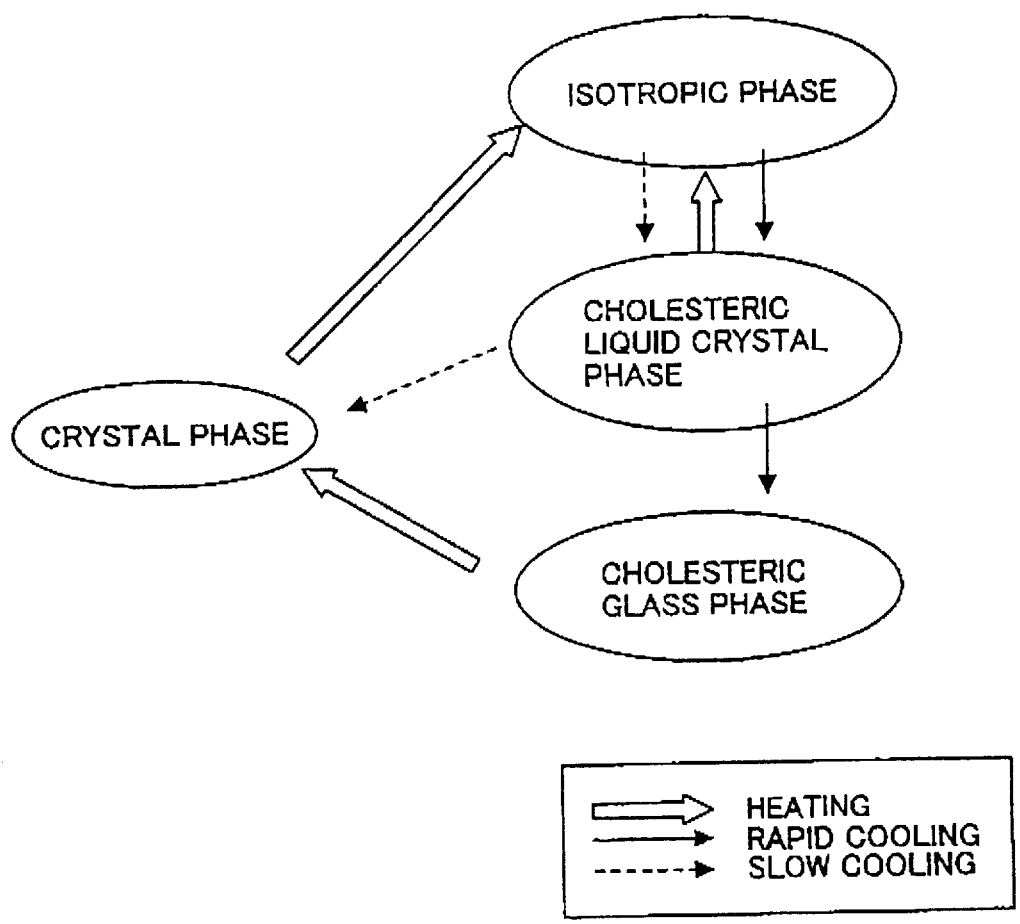
FIG. 2 illustrates a model view of a phase change of a cholesteric liquid crystal compound according to the present invention.

FIG. 2 illustrates a model view of a phase change of a cholesteric compound according to the present invention. This compound is heated from a crystal phase thereof to become an isotropic phase at a temperature more than melting point thereof. From the isotropic phase, when this compound is cooled down to a temperature range which exhibits a cholesteric liquid crystal phase, this compound in the cholesteric liquid crystal phase shows typical iridescent colors ranging from blue to red, depending upon the temperature thereof. For the compound in the cholesteric liquid crystal phase, light having shorter wavelength tends to be reflected at higher temperature of the cholesteric liquid crystal phase, while light having longer wavelength is likely to be reflected at lower temperature thereof. It is preferred that the compound shows the cholesteric liquid crystal phase between 80° C. and 150° C.

Figure 1:
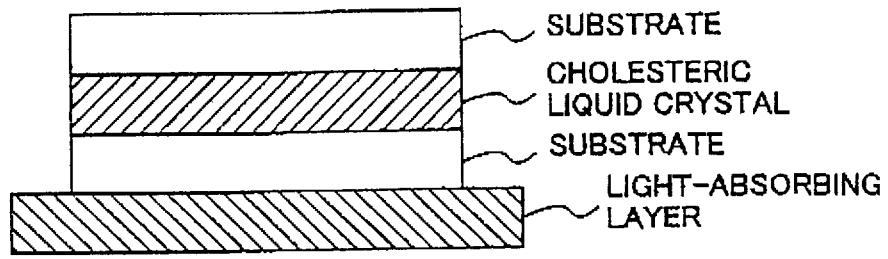
FIG. 1 shows a schematic sectional view of a liquid crystal element which has a structure that a cholesteric liquid crystal-based recording material is placed between two substrates, one of the two substrates having a light-absorbing layer provided thereon.

When the compound in the cholesteric liquid crystal phase is slowly cooled down to the room temperature, there may be occasions that crystallization takes place during cooling process, thereby becoming clouded state due to the scattering of light. At this time, in a case where a recording layer has a thickness of less than a few ten $\mu$ms, it often happens that the recording layer may be observed as being transparent When the compound in the cholesteric liquid crystal phase showing the various colors which are dependent on the temperature is rapidly cooled down to the room temperature, the compound becomes a glassy solid (which is referred to as a cholesteric glass phase) while keeping a helical molecular orientation of the cholesteric liquid crystal phase. This results in fixation of a reflecting color observed at the temperature where the rapid cooling started. This reflecting color is dependent upon a helical pitch of the cholesteric liquid crystal phase. As shown in FIG. 1, by providing a light-absorbing layer on one side of the substrates in order to absorb light passing through the cholesteric glass phase out of an incident light into the cholesteric glass phase, the only reflecting light can be observed, thus leading to contrast enhancement.

On the other hand, it is possible to vary the reflecting color of the cholesteric glass phase by changing a cooling rate suitably from the isotropic phase to the room temperature. The light of the shorter wavelength reflected at higher temperature can be fixed in a case of the higher cooling rate, while the light of the longer wavelength reflected at lower temperature can be fixed in a case of the lower cooling rate.

By changing the cholesteric glass phase recorded once to the isotropic phase or the cholesteric liquid crystal phase by heating the cholesteric glass phase again, a recording is erased so that a new information can be recorded under another cooling conditions, thereby allowing the recording portion showing an arbitrary reflecting color to be recorded reversibly. The clouded state can also be recorded by re-heating the cholesteric glass phase to approximately 100° C. and then cooling to form the crystal phase. However, it often happens that the cholesteric glass phase is directly transferred to the liquid crystal phase, depending on nature of materials.

For the cholesteric liquid crystal compound, there is tendency that the compound crystallizes even under rapid cooling conditions if the compound has a molecular weight of less than 900, thereby failing to fix the cholesteric glass phase. It is believed that this phenomenon is attributed to rapid re-orientation of a molecule with rapid cooling. In addition, if the compound has a molecular weight of more than 10,000, it is difficult to record and erase practically due to a slow response of the compound.

The cholesteric liquid crystal compounds used in the present invention are preferably compounds which have glass transition temperature equal to or more than 30° C. because the reflecting color can not be preserved stably at the room temperature if the compound has the glass transition temperature of less than 30° C. In addition, since it is difficult to record reversibly by re-heating if the compound is a polymer, the cholesteric liquid crystal compound preferably has the molecular weight of less than 2,000. Thus, the reversible recording material according to the present invention preferably comprises at least one cholesteric liquid crystal compound having the above properties.

As examples of the cholesteric liquid crystal compound, the cholesteric liquid crystal compounds which represent by the following formulae (I) and (II), alone or in combination, are useful for the present invention:

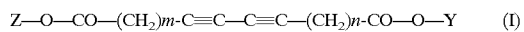

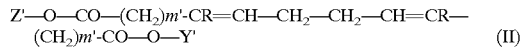

wherein Z, Y, Z' and Y' are independently selected from the group consisting of cholesteryl, hydrogen and alkyl; R is hydrogen or alkyl; and m, n, m' and n' are independently integers equal to or more than 1.

More specifically, it is preferable for the cholesteric liquid crystal compounds to have the formulae (I) and (II) wherein Z, Y, Z' and Y' are cholesterol groups, R is hydrogen, m=n and m'=n', m is from 2 to 10, and m' is from 5 to 7.

In the reversible recording material according to the present invention, by using at least two cholesteric liquid crystal compounds, as stated above, which are compatible each other, and mixing these compounds to form the reversible recording material a strength of intermolecular interaction between these compounds can be modified as compared to the each compound alone. This makes it possible to widen the reflecting wavelength range because the temperature range showing the liquid crystal phase, a refractive index range for the reversible recording material and a width of the helical pitch for the cholesteric liquid crystal can be widened and ameliorated. In addition, this also makes it possible for a slow rate for cooling process to fix the cholesteric reflecting color and facilitates fixation of the reflecting color. It is believed that the above advantages of the present invention are attributed to a slow change of the cholesteric pitch against the temperature change and to a slow molecular motion in the cholesteric liquid crystal phase.

By mixing more than one cholesteric liquid crystal compound in a suitable ratio thereof according to intended characteristics, it is possible to obtain the reversible recording material in which the reflecting wavelength range is wide and fixation of the reflecting color can be achieved easily.

The term "rapid cooling" used herein includes a cooling rate more than 140° C./s, preferably more than 300° C./s, more preferably 1000° C./s.

The term slow cooling used herein includes a cooling rate less than 100° C./s.

[Embodiment]

Using a cooling means, a cooling process is carried out for the reversible recording material comprising the cholesteric liquid crystal compounds as represented by the formulae (I) and (II). More specifically, cholesteric liquid crystal compounds represented by the following formulae (III) and (IV) are mixed by varying a mixture ratio thereof.

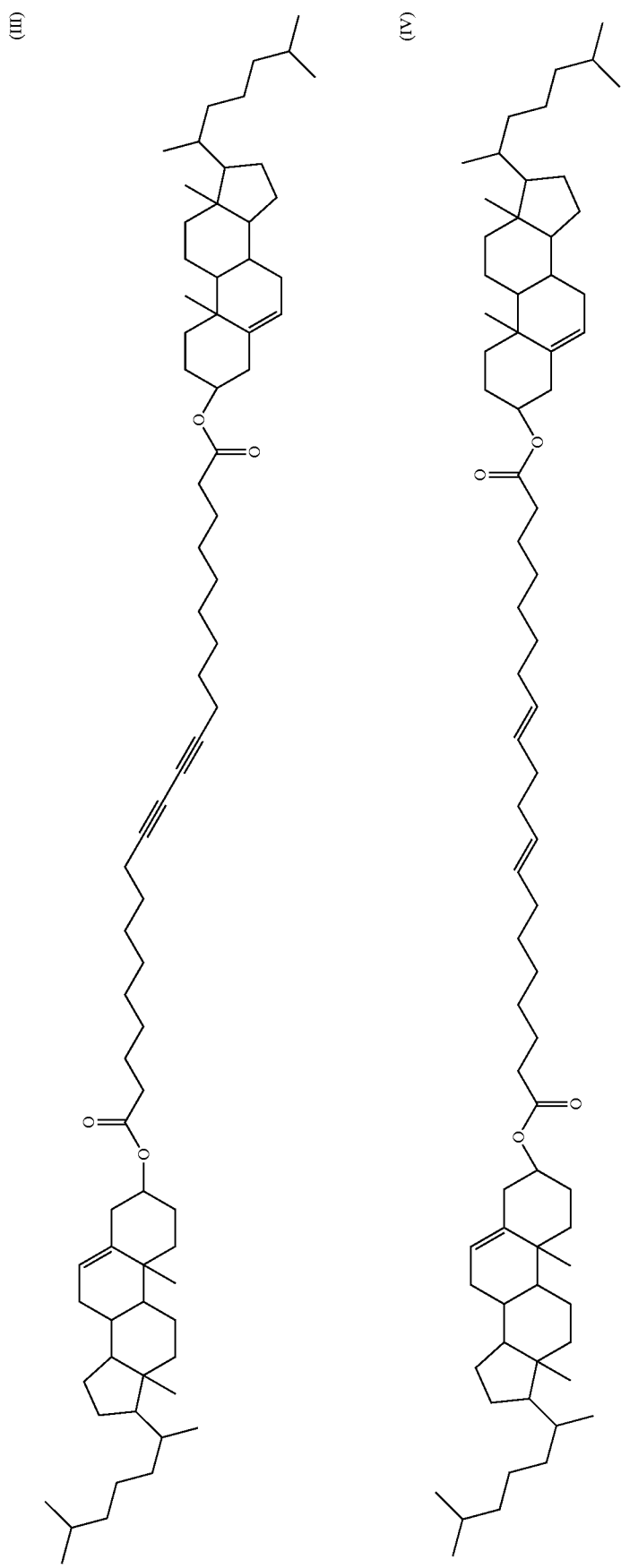

As shown in FIG. 1, the reversible recording material comprising cholesteric liquid crystal mixture is placed between two substrates and the above mixture is heated into a transparent state by a suitable heating means. The cooling step is then performed to observe the reflecting color from the cholesteric liquid crystal phase at each temperature. For every mixture used in the present invention, the mixture in the cholesteric liquid crystal phase exhibits a blue color at higher temperature. As the temperature decreases, the wavelength of the reflecting light shifts to longer side. In addition, by mixing the cholesteric liquid crystal, the reflecting light can be fixed even when cooling slowly. In a liquid crystal mixture system comprising a first cholesteric liquid crystal compound represented by the formula (I) having m(1) and n(1) thereof and a second cholesteric liquid crystal compound represented by the formula (II) having m(2) and n(2) thereof, wherein Z, Y, Z' and Y' are cholesterol groups, m(1) n(1), m(2)=n(2) and m(1)=m(2)-1, the reflecting light up to the infrared light can be fixed without occurrence of crystallization even when cooling slowly.

The thickness of a thermal reversible recording layer used in the present invention is from 0.5 to 50 μm, and preferably from 1 to 20 μm. When the thickness of the thermal reversible recording layer is too thin, a reflecting ratio at the wavelength of the maximum reflection decreases, thereby giving rise to poor contrast of a display image. When the thickness is too thick, the contrast of the display image may be degraded due to large absorption of the thermal reversible recording layer.

It should be noted that it is preferable to use the only cholesteric liquid crystal compound for the thermal reversible recording layer. However, the thermal reversible recording layer may comprise a binder resin and a spacer particle. Examples of such binder include poly(vinyl chloride), poly(vinyl acetate), an epoxy resin, a phenoxy resin, a acrylic resin, polyurethane, polyester or the like. Suitable spacer particles used in the present invention include those for use in a general liquid crystal display.

The wavelength of the reflecting light preferably ranges between 400 nm and 700 nm in a visible light region. In this case, the reflecting light can be visually recognized by a human eye. However, in a case where the reflecting light is mechanically read by a device or the like, the wavelength of the reflecting light may exist in an ultraviolet region or in a infrared region.

Examples of the heating means used in the present invention include, but are not limited to, a hot plate, laser light, a thermal head or the like.

Examples of the cooling means used in the present invention include, but are not limited to, water cooling, air cooling, contact with a metal plate and a glass plate or the like.

Suitable substrates used in the present invention include, but are not limited to, a glass substrate, a plastic substrate or the like.

As a criterion for fixation of the reflecting color, use was preferably made of dipping in water at 40° C.

The present invention will be illustrated in more detailed with reference to examples given below, but these are not to be construed as limiting the invention.

EXAMPLE 1

A compound represented by the above formula (I) wherein Z and Y are cholesteryl groups and m=n=5, and the compound represented by the above formula (IV) were mixed at a weight ratio of 1:5, so that a mixture of liquid crystal for the reversible recording material was prepared. The mixture was placed between two glass substrates (a thickness of the substrate being 130 μm) on a hot plate so as to have a thickness of 10 μm. After heating to about 120° C. where the mixture became a transparent state, as the temperature of the mixture decreased, the mixture exhibited blue light at about 105° C. and red light at 30° C. When the mixture was rapidly cooled from each temperature by dipping in water at the room temperature, the mixture solidified while keeping the respective light observed at each temperature at which the rapid cooling started, so that the reflecting color could be fixed. Stability for the respective reflecting color fixed at each temperature was for about 20 minutes at the room temperature, respectively.

EXAMPLE 2

The two cholesteric liquid crystal compounds represented by the respective above (III) and (IV) were mixed at a weight ratio of 1:4 to form a mixture. The mixture was placed between two glass substrates (the thickness of the substrate being 130 μm) on the hot plate so as to have the thickness of 10 μm. After heating to about 130° C. where the mixture became the transparent state, as the temperature of the mixture decreased gradually. the mixture showed blue light at about 120° C. and red light at about 80° C. When the mixture was rapidly cooled from about 80° C. by dipping in water at 40° C., the mixture solidified while keeping the red light observed at 80° C. at which the rapid cooling started, so that the reflecting red color could be fixed. Stability for the reflecting color fixed at 80° C. was for approximately 20 minutes at the room temperature.

EXAMPLE 3

The two cholesteric liquid crystal compounds represented by the respective above (III) and (IV) were mixed at a weight ratio of 10:1 to form a mixture. The mixture was placed between two glass substrates (the thickness of the substrate being 130 μm) on the hot plate so as to have the thickness of 10 μm. After heating to about 120° C. where the mixture became the transparent state, the temperature of the mixture fell to 60° C. and the mixture reflected red light at this temperature. When the mixture was rapidly cooled from 60° C. by dipping in water at 40° C., the mixture solidified while keeping the red light observed at 60° C. where the rapid cooling started, so that the reflecting red color could be fixed. The reflecting red color fixed at 60° C. was stored stably for more than 2 weeks at the room temperature.

EXAMPLE 4

The two cholesteric liquid crystal compounds represented by the respective above (III) and (IV) were mixed at a weight ratio of 10:1 to form a mixture. The mixture was placed between two glass substrates (the thickness of the substrate being 130 μm) on the hot plate so as to have the thickness of 10 μm. After heating to about 120° C. where the mixture became the transparent state, the temperature of the mixture fell to 105° C. and the mixture reflected a blue color at this temperature. When the mixture was rapidly cooled from 105° C. by dipping in water at 40° C., the mixture solidified while keeping the blue light observed at 105° C. where the rapid cooling started, so that the reflecting blue color could be fixed. Stability for the reflecting blue color fixed at 105° C. was for more than 2 weeks at the room temperature.

Comparative Example 1

The only one cholesteric liquid crystal compound represented by the above (IV) was placed between two glass substrates (the thickness of the substrate being 130 μm) on the hot plate so as to have the thickness of 10 μm. After heating to about 130° C. where the compound became the transparent state, the temperature of the compound fell to 105° C. and the compound reflected green light at this temperature. When the compound was rapidly cooled from 105° C. by dipping in water at 40° C., the compound solidified to reflect yellow light. It is not desirable to reflect the different light from the green light which was observed at the temperature where the rapid cooling started. Stability for the reflecting yellow color thus fixed was for more than 2 weeks at the room temperature.

EXAMPLE 5

The two cholesteric liquid crystal compounds represented by the respective above (III) and (IV) were mixed at a weight ratio of 4:1 to form a mixture. The mixture was placed between two glass substrates (the thickness of the substrate being 130 μm) on the hot plate so as to have the thickness of 10 μm. After heating to about 120° C. where the mixture became the transparent state, as the temperature of the mixture decreased gradually. the mixture reflected light ranging from a blue color at about 110° C. to a red color at about 60° C. When the mixture was rapidly cooled from 60° C. by dipping in water at 40° C., the mixture solidified while keeping the red light observed at 60° C. at which the rapid cooling started, so that the reflecting red color could be fixed. Stability for the reflecting red color fixed at 60° C. was for more than 2 weeks at the room temperature.

EXAMPLE 6

The two cholesteric liquid crystal compounds represented by the respective above (III) and (IV) were mixed at a weight ratio of 3:1 to form a mixture. The mixture was placed between two glass substrates (the thickness of the substrate being 130 μm) on the hot plate so as to have the thickness of 10 μm. After heating to about 120° C. where the mixture became the transparent state, as the temperature of the mixture decreased gradually, the mixture reflected light ranging between a blue color at about 110° C. and a red color at about 65° C. The mixture became the transparent state at 60° C. When the mixture was rapidly cooled from 60° C. by dipping in water at 40° C., the mixture solidified while keeping infrared light observed by means of a speotrophotometer, so that the reflecting infrared color could be fixed. Stability for the reflecting infrared color fixed at 60° C. was for 6 hours at the room temperature.

EXAMPLE 7

The two cholesteric liquid crystal compounds represented by the respective above (III) and (IV) were mixed at a weight ratio of 5:1 to form a mixture. The mixture was placed between two glass substrates (the thickness of the substrate being 130 μm) on the hot plate so as to have the thickness of 10 μm. After heating to about 120° C. where the mixture became the transparent state, as the temperature of the mixture decreased gradually, the mixture reflected light between a blue color at about 115° C. and a red color at about 65° C. The mixture became the transparent state at 55° C. When the mixture was rapidly cooled from 55° C. by dipping in water at 40° C., the mixture solidified while keeping infrared light observed by means of the spectrophotometer, so that the reflecting infrared color could be fixed. Stability for the reflecting infrared color fixed at 55° C. was for more than 2 weeks at the room temperature.

EXAMPLE 8

The two cholesteric liquid crystal compounds represented by the respective above (III) and (IV) were mixed at a weight ratio of 15:1 to form a mixture. The mixture was placed between two glass substrates (the thickness of the substrate being 130 μm) on the hot plate so as to have the thickness of 10 μm. After heating to about 120° C. where the mixture became the transparent state, the mixture reflected an orange color at 65° C. When the mixture was rapidly cooled from 65° C. by dipping in water at 40° C., the mixture solidified while keeping the orange light observed at about 65° C., so that the reflecting orange color could be fixed. A stability for the reflecting orange color fixed at about 65° C. was for more than 2 weeks at the room temperature.

EXAMPLE 9

The two cholesteric liquid crystal compounds represented by the respective above (III) and (IV) were mixed at a weight ratio of 15:1 to form a mixture. The mixture was placed between two glass substrates (the thickness of the substrate being 130 μm) on the hot plate so as to have the thickness of 10 μm. After heating to about 120° C. where the mixture became the transparent state, when the temperature of the mixture fell to less than 65° C., crystallization occurred gradually. Therefore, it was found that the wavelength range of the reflecting light could not be improved by increasing the weight ratio of the compound represented by the formula (III) more than the above weight ratio.

EXAMPLE 10

A compound represented by the above formula (I) wherein Z and Y are cholesterol groups and $-m=n=7$, and the compound represented by the above formula (III) were mixed at a weight ratio of 1:5, so that a mixture of liquid crystal for the reversible recording material was prepared. The mixture was placed between two glass substrates (the thickness of the substrate being 130 μm) on the hot plate so as to have the thickness of 10 μm. After heating to about 120° C. where the mixture became the transparent state, as the temperature of the mixture decreased, the mixture exhibited blue light at about 110° C. and red light at 80° C. and became the transparent state at about 65° C. when the mixture was rapidly cooled from 65° C. by dipping in water at room temperature, the mixture solidified while keeping infrared light observed by means of the spectrophotometer, so that the reflecting infrared color could be fixed. Stability for the reflecting infrared color fixed at 65° C. was for more than 2 weeks at the room temperature.

EXAMPLE 11

As with example 10, after heating to about 120° C. where the mixture became the transparent state, when the temperature of the mixture decreased, a decreasing rate of the temperature between 80° C. to 50° C. was retarded to establish about 4° C./min. In this case, the mixture also became the transparent state at about. 65° C. When the mixture was rapidly cooled from 65° C. by dipping in water at room temperature, the mixture solidified while keeping infrared light observed by means of the spectrophotometer, so that the reflecting infrared color could be fixed. Stability for the reflecting infrared color fixed at 65° C. was for more than 2 weeks at the room temperature.

Comparative Example 2

As with example 7, after heating to about 120° C. where the mixture became the transparent state, as the temperature of the mixture decreased, the decreasing rate of the temperature between 80° C. to 50° C. was retarded to set about 4° C./min. In this case, the liquid crystal state of the mixture was not kept so as to initiate crystallization. Crystallization prevents the mixture from reflecting the light.

Comparative Example 3

The only one cholesteric liquid crystal compound represented by the above (III) was placed between two glass substrates (the thickness of the substrate being 130 μm) on the hot plate so as to have the thickness of 10 μm. After heating to about 120° C. where the compound became the transparent state, as the temperature of the compound decreased gradually, the compound reflected only light ranging between blue light and green light. When the compound in the transparent state was rapidly cooled down to about 80° C. The compound in the cholesteric liquid crystal phase showed reflecting orange light. At this time, this compound was rapidly cooled by dipping in water so that the above orange reflecting light could be fixed. Although the orange reflecting light could be fixed, it was not easy to fix the above reflecting light.

Comparative Example 3

Figure 3:
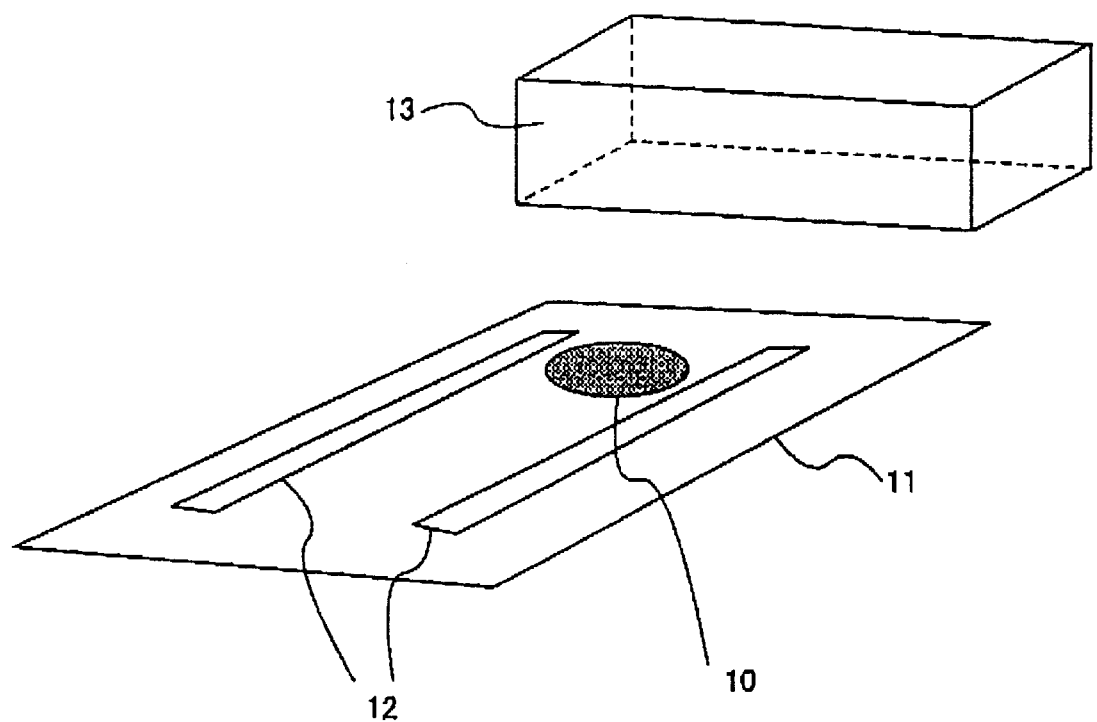
FIG. 3 shows a poly(ether-imide) substrate and a blade used in comparative example 3.

As shown in FIG. 3, a 100 μm length of a wet gap 12 formed of poly(ethylene terephthalate) was fixed on a poly (ether-imide) substrate 11 having a thickness of 75 μm, A solution 10 containing a 7:3 weight ratio of the compound represented by the formula (III) and poly(methyl methacrylate) dissolved in methylene chloride was dropped onto this substrate. The dropped solution was spread on the poly(ether-imide) substrate 11 by means of a blade 13. Immediately, the substrate 11 thus prepared was dried in an oven at 120° C. for 3 minutes to form a liquid crystal-dispersed in polymer film having the thickness of 10 μm. Although the above polymer film was examined by visual inspection of a reflecting color from the film with varying the temperature thereof, no difference between the film and the compound (III) alone was observed in terms of the reflecting color. No improvement was achieved in this experiment.

The above results are shown in Table 1.

TABLE 1

| Weight Ratio of III and IV | 0:1 | 1:4 | 3:1 | 4.1 | 5:1 | 10:1 | 15:1 | 1:0 |
| --- | --- | --- | --- | --- | --- | --- | --- | --- |
| Fixed reflecting color[1] | Orange | Red | Infra red | Red | Infra red | Red | Orange | Green |
| Storage Stability at the room temperature[2] | ○ | X | X | ○ | ○ | ○ | ○ | ○ |
| Rapid cooling by water at 40° C. | Failure | Good | Good | Good | Good | Good | Good | Good |

[1]This color indicates a color of maximum wavelength observed in each of the above example. Additionally, a blue color can be fixed in each of the above example.
[2]Estimate is as follows.
○: good,
X: poor As can be seen from the results listed in Table 1, when the reversible recording material comprising the cholesteric liquid crystal compounds according to the present invention is employed, a wide wavelength range of the reflecting light can be obtained without crystallization of the cholesteric liquid crystal compounds. Furthermore, storage stability of the reflecting color is excellent for a long period.

The present invention is not limited to the specifically disclosed embodiments, and variations and modification may be made without departing from scope of the present invention.

The present application is based on Japanese priority application Nos. 11-273471 filed on Sep. 27, 1999 and 2000-056552 filed on Mar. 1, 2000, the entire contents of which are hereby incorporated by reference.

What is claimed is:

1. A reversible recording material which is sensitive to heat, comprising:
    a liquid crystal mixture comprising at least two cholesteric liquid crystal compound each having a molecular weight of 900 to 10,000, said at least two cholesteric liquid crystal compounds being compatible each other, wherein after at least a part of said reversible recording material is heated to a temperature where said at least a part of said reversible recording material becomes a cholesteric liquid crystal phase, said at least a part of said reversible recording material is rapidly cooled down to below a glass transition temperature thereof, so that a reflecting color from said reversible recording material can be fixed to achieve a recording.

2. A reversible recording material which is sensitive to heat, comprising:

a liquid crystal mixture comprising at least two cholesteric liquid crystal compounds each having a molecular weight of 900 to 10,000, said at least two cholesteric liquid crystal compounds being compatible each other, wherein after at least a part of said reversible recording material is heated to a temperature where said at least a part of said reversible recording material becomes a isotropic phase, said at least a part of said reversible recording material is cooled down to below a glass transition temperature thereof at a predetermined cooling rate based on a reflecting color to be fixed, so that said reflecting color from said reversible recording material can be fixed to achieve a recording.

3. The reversible recording material as claimed in claim 1, wherein said at least one cholesteric liquid crystal compound which is contained in said reversible recording material has a molecular weight of less than 2000 and a glass transition temperature equal to or more than 30° C.

4. The reversible recording material as claimed in claim 2, wherein said at least one cholesteric liquid crystal compound which is contained in said reversible recording material has a molecular weight of less than 2000 and a glass transition temperature equal to or more than 30° C.

5. The reversible recording material as claimed in claim 1, wherein said liquid crystal mixture constituting the reversible recording material comprises cholesteric liquid crystal compounds represented by the following formulae (I) and (II):

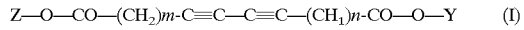

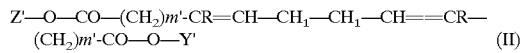

wherein Z, Y, Z' and Y' are independently selected from the group consisting of cholesterol, hydrogen and alkyl; R is hydrogen or alkyl; and m, n, m' and n' are independently integers equal to or more than 1.

6. The reversible recording material as claimed in claim 2, wherein said liquid crystal mixture constituting the reversible recording material comprises cholesteric liquid crystal compounds as represented by the following formulae (I) and (II):

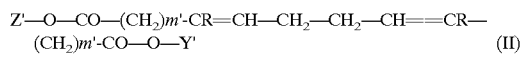

wherein Z, Y, Z' and Y' are independently selected from the group consisting of cholesteryl, hydrogen and alkyl; R is hydrogen or alkyl; and m, n, m' and n' are independently integers equal to or more than 1.

7. The reversible recording material as claimed in claim 5, wherein said cholesteric liquid crystal compound represented by the above formula (I) is a compound represented by the following formula (III) where Z and Y are cholesteryl groups and m=n=8, and said cholestexic liquid crystal compound represented by the above formula (II) is a compound represented by the following formula (IV) where Z' and Y' are cholesteryl groups, R is a hydrogen atom and m'=n'=6.

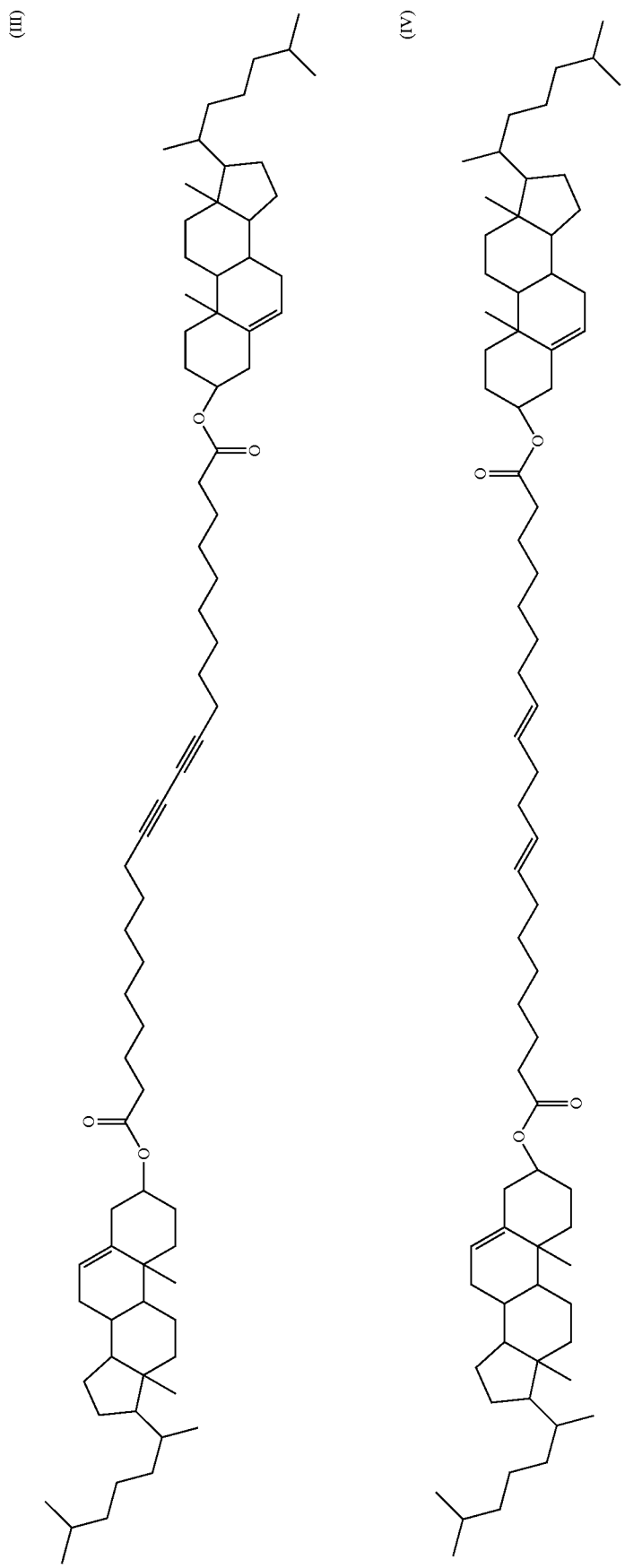

8. The reversible recording material as claimed in claim 6, wherein said cholesteric liquid crystal compound represented by the above formula (I) is a compound represented by the following formula (III) where Z and Y are cholesteryl groups and m=n=8 and said cholesteric liquid crystal compound represented by the above formula (II) is a compound represented by the following formula (IV) where Z' and Y' are cholesteryl groups, R is a hydrogen atom and m'=n'=6.

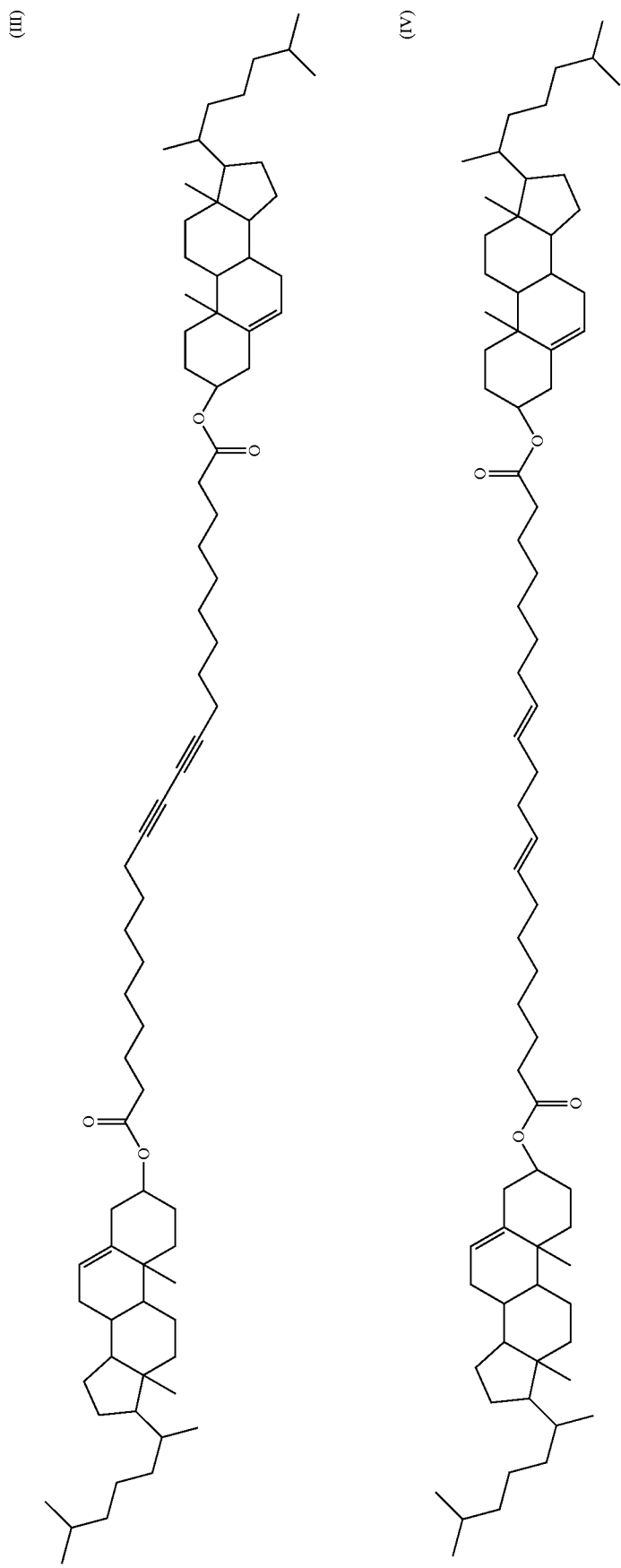

9. The reversible recording material as claimed in claim 5, wherein said liquid crystal mixture comprising a first cholesteric liquid crystal compound and a second cholesteric liquid crystal compound is formed of compounds represented by the above formula (I) where m is equal to n, and when m for said first cholesteric liquid crystal compound is m(1) and m for said second compound is m(2), there is a relationship that m(1)=m(2)−1.

10. The reversible recording material as claimed in claim 6, wherein said liquid crystal mixture comprising a first cholesteric liquid crystal compound and a second cholesteric liquid crystal compound is formed of compounds represented by the above formula (I) where m is equal to n, and when m for said first cholesteric liquid crystal compound is m(1) and m for said second compound is m(2), there is a relationship that m(1)=m(2)−1.

11. The reversible recording material of claim 1, wherein the reversible recording material has a thickness of from 0.5 to 50 μm.

12. The reversible recording material of claim 2, wherein the reversible recording material has a thickness of from 0.5 to 50 μm.

13. A reversible recording medium comprising a recording layer disposed between two substrate layers, wherein said recording layer comprises the reversible recording material of claim 1.

14. A reversible recording medium comprising a recording layer disposed between two substrate layers, wherein said recording layer comprises the reversible recording material of claim 2.

15. The reversible recording medium of claim 13, wherein the substrates are glass.

16. The reversible recording medium of claim 14, wherein the substrates are glass.

17. The reversible recording medium of claim 13, wherein the recording layer further comprises a binder resin and a spacer particle.

18. The reversible recording medium of claim 14, wherein the recording layer further comprises a binder resin and a spacer particle.

19. The reversible recording medium of claim 17, wherein the binder resin is selected from the group consisting of poly(vinyl chloride), poly(vinyl acetate), an epoxy resin, a phenoxy resin, an acrylic resin, a polyurethane, and a polyester.

20. The reversible recording medium of claim 18, wherein the binder resin is selected from the group consisting of poly(vinyl chloride), poly(vinyl acetate), an epoxy resin, a phenoxy resin, an acrylic resin, a polyurethane, and a polyester.

* * * * *